UNITED STATES PATENT OFFICE.

JOSEPH C. TUCKER, OF NEW YORK, N. Y.

IMPROVEMENT IN COMPOSITION-BLOCKS FOR PAVEMENTS, &c.

Specification forming part of Letters Patent No. 128,680, dated July 2, 1872; antedated June 29, 1872; reissue No. 5,043, dated August 27, 1872.

Specification describing certain Improvements in Compositions for Forming Blocks for Pavements, Building, Submarine Walls, Roofs, Tiles, Pipes, Slabs, and for other purposes, invented by JOSEPH C. TUCKER, of the city and county of New York, in the State of New York.

My invention consists in the application and use of "slag," (the refuse or residuum of smelting or other furnaces,) molded, while in a molten state, with crushed stone or other known materials, so as to be compressed into blocks; in a combination of asphaltum and such "slag," which, when so combined and properly mixed, form a cheap and durable compound for making artificial-stone blocks for pavements, building, submarine walls, roofs, tiles, pipes, slabs, and for other purposes; also, in combining with such "slag" crushed the cement of commerce, in proper proportions and conditions, for the same purposes.

In carrying out my inventions, I take slag in a molten or hot condition and combine and mix it with broken stone or other known materials, and, by means of molds, form it into blocks. In a combination with asphaltum, I employ about the following proportions, namely: Iron "slag,"—the residuum of smelting or other furnaces—(80,) eighty parts; asphaltum, (20,) twenty parts. The "slag," broken or crushed to a proper size, is placed within a rotating cylinder, or other suitable mixer, where it is first heated, and then mechanically incorporated with the previously-prepared asphaltum, forming thus a homogeneous mass, ready to be passed into molds of any desired form, and there subjected to pressure or concussion; or the plastic mass may be spread directly upon the ground or surface to be covered, and pressed, by means of rollers or stamps, into any desired shape or device; or, further, used for any of the various purposes to which it may be applied.

When such "slag" crushed is used, combined with the cement of commerce, it is reduced to such condition and employed in such proportions and manner in an aqueous mixture as its different applications may require.

I do not limit myself to the above-named proportions of ingredients used, as they must necessarily be increased or diminished, as required by the different purposes to which the combinations are applied.

Having thus described my invention, what I claim as new, and desire to secure by Letters Patent, is—

1. Blocks formed by molding from "slag" the refuse or residuum of smelting or other furnaces, combined with crushed stone or other materials while the slag is in a heated or molten state, substantially as and for the purpose set forth.

2. Iron or such other "slag," crushed and combined with asphaltum and pressed into blocks, substantially as and for the purposes set forth.

3. A compound composed of crushed iron slag and asphaltum spread while hot upon the ground, or the surface to be covered and subjected to pressure by suitable devices, substantially as described, for the purpose specified.

4. A cement stone, composed of "slag," crushed, and the cement of commerce, substantially as and for the purposes set forth.

In testimony that I claim the foregoing I have hereto signed my name this 31st day of July, A. D. 1872.

J. C. TUCKER.

Witnesses:
FRANK B. MESICK,
JAS. S. WETHERED.